Oct. 13, 1953  E. BURRELL  2,655,033
SPIN-TESTING DEVICE
Filed June 19, 1952  4 Sheets-Sheet 1
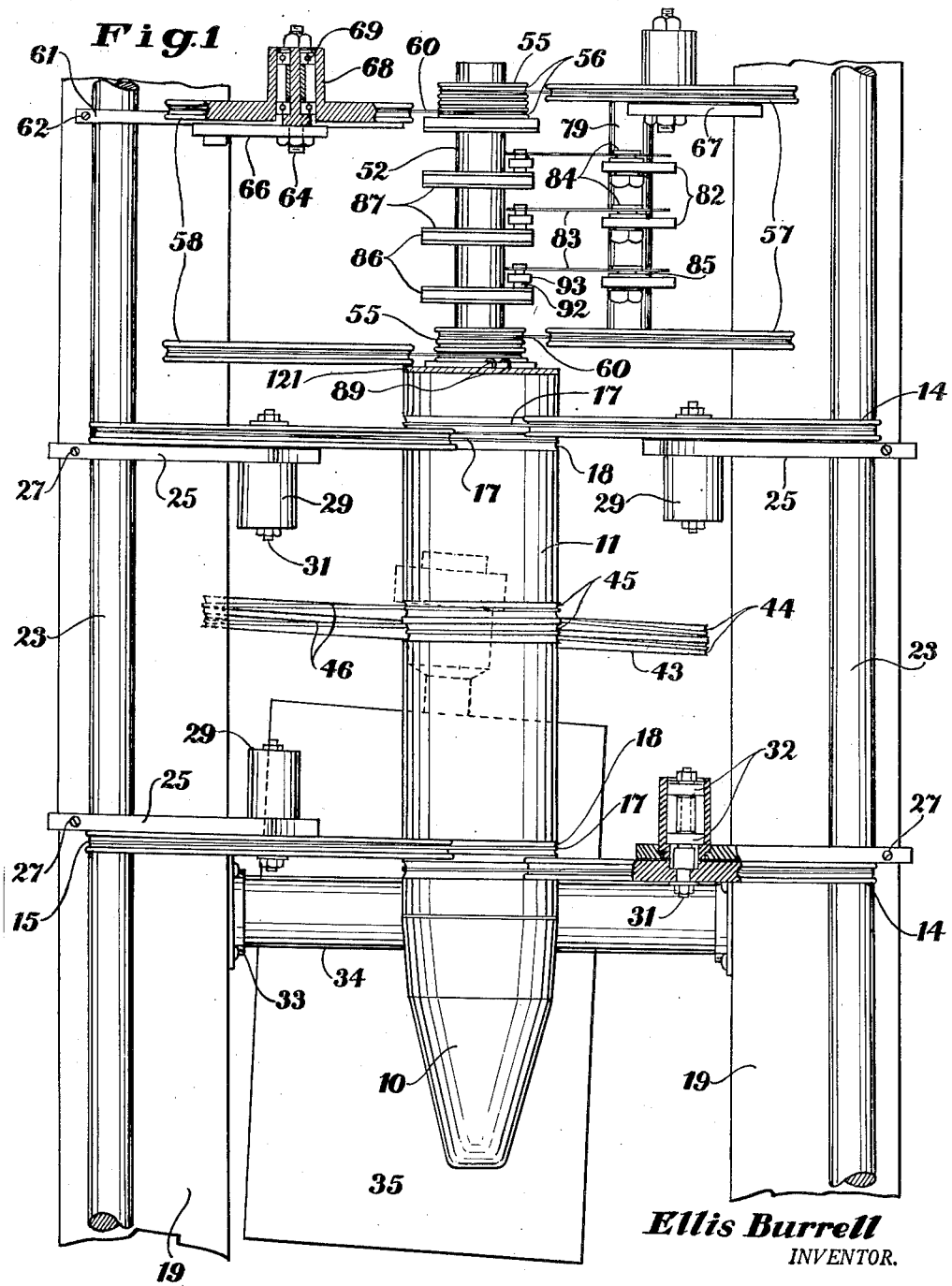
Ellis Burrell
INVENTOR.
BY
ATTORNEYS Oct. 13, 1953      E. BURRELL      2,655,033
SPIN-TESTING DEVICE
Filed June 19, 1952      4 Sheets-Sheet 2
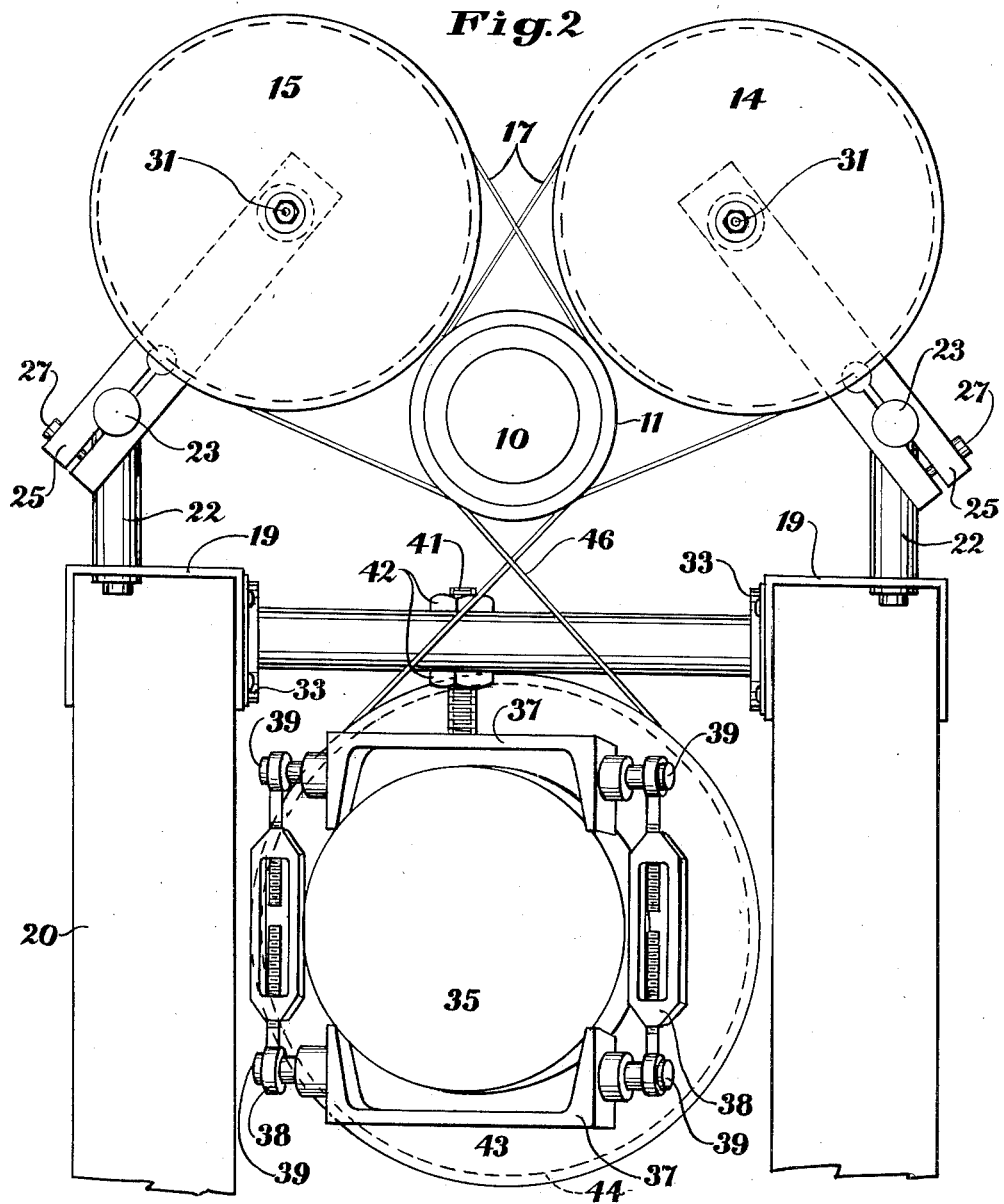
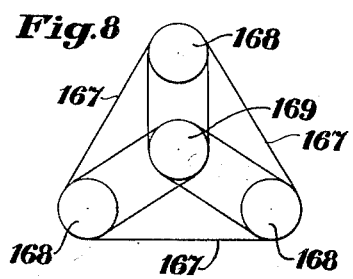
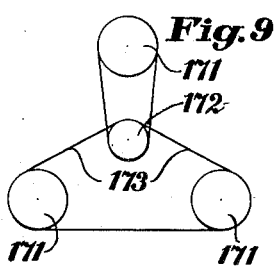
Ellis Burrell
INVENTOR.

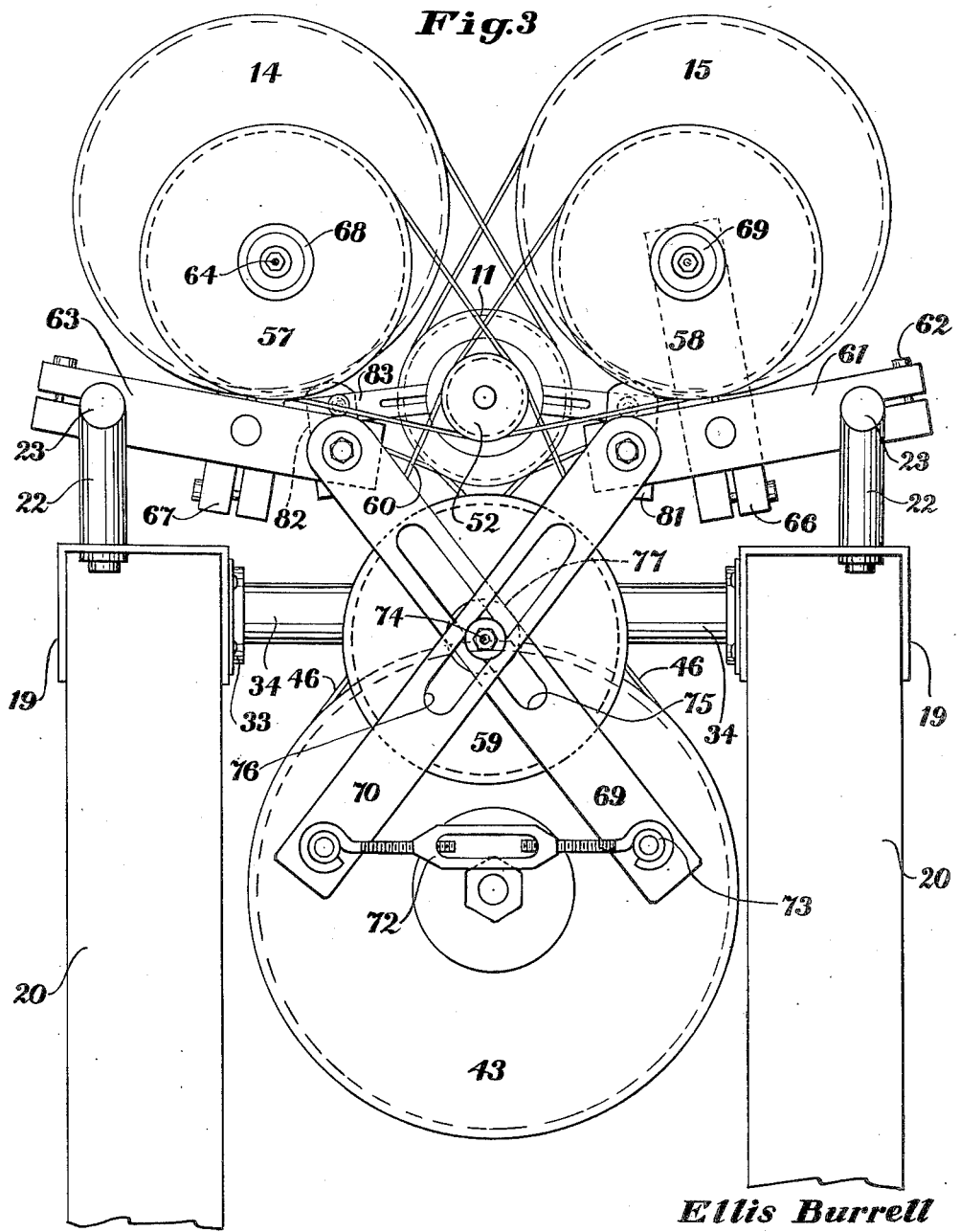

Oct. 13, 1953     E. BURRELL     2,655,033
SPIN-TESTING DEVICE
Filed June 19, 1952     4 Sheets-Sheet 4
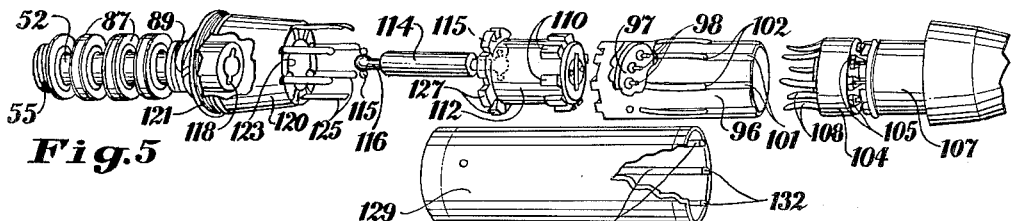
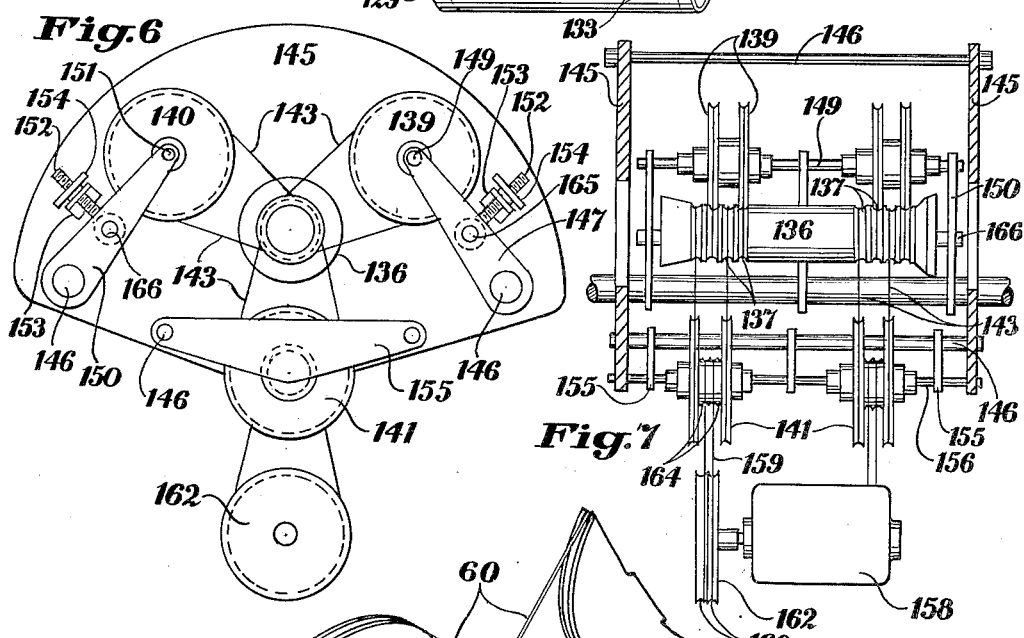
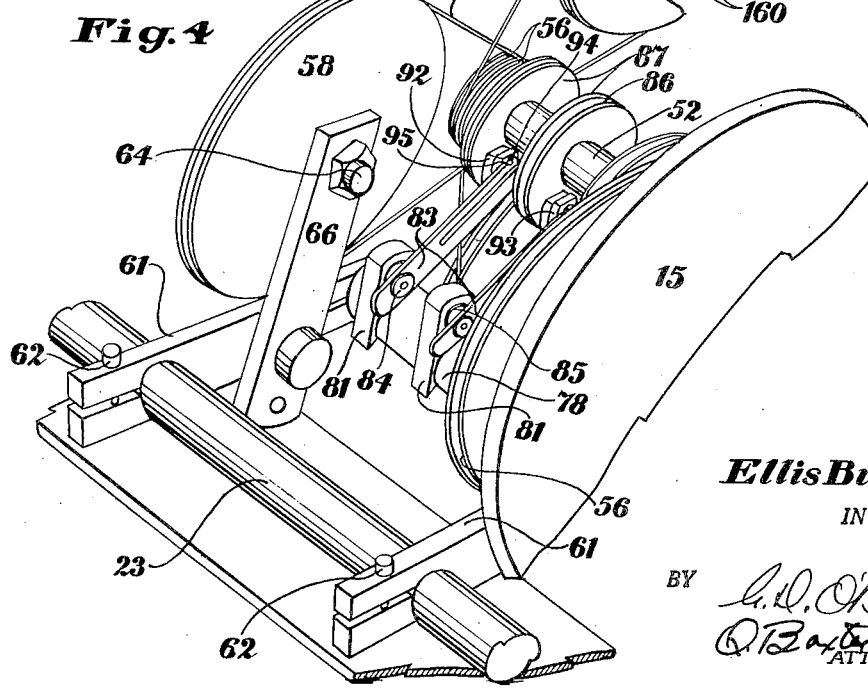
*Ellis Burrell*
INVENTOR.
BY
ATTORNEYS Patented Oct. 13, 1953

2,655,033

UNITED STATES PATENT OFFICE 2,655,033

SPIN-TESTING DEVICE

Ellis Burrell, Rochester, N. Y., assignor, by mesne assignments, to the United States of America as represented by the Secretary of the Navy Application June 19, 1952, Serial No. 294,336

14 Claims. (Cl. 73—1)

The present invention relates to testing equipment and in particular to apparatus for testing objects which are subject to high centrifugal force, or which are intended to function at high angular velocities, in use.

It has heretofore been impossible to spin-test in the laboratory an object comparable in mass to an artillery projectile at the high angular velocities which such projectiles encounter in flight. Objects of small mass can be rotated at high speeds through the use of an air stream to support the object, but this method is impracticable with comparatively heavy objects. Conventional bearings rapidly overheat at high rotational velocities when used to support objects of large mass, the heating tending to increase with the size of the object and the bearings. Overheating becomes particularly aggravated when the object is even slightly unbalanced, making it impossible to spin-test an unbalanced load with conventional bearing supports. In addition, the use of conventional bearings to support generally cylindrical objects similar in shape to artillery projectiles precludes access from either end of the object and thus prevents the use of electrical take-off means for testing purposes at the ends of the object.

This impracticability of testing in the laboratory of an artillery projectile, or a component for use therein, under the conditions of centrifugal force encountered in the flight of the projectile, has in the past necessitated that firing tests be conducted at a proving ground each time an experimental change was proposed in a projectile. The results of a firing test only prove that an artillery projectile component being tested functions or fails to function, and, inasmuch as it is not feasible to install telemetering equipment in the shell, provides no indication of the intervals in flight at which mechanisms within the projectile operate. In such projectile devices as radio proximity fuzes, it is extremely important for design purposes to measure such phenomena as the time after setback that the conventional deferred action type battery is activated, the angular velocity and the time in flight at which the short-circuit is removed from the electric primer to arm the fuze, and the angular velocity and the time in flight at which the conventional radio circuits become operative. Heretofore it has been impossible to obtain such measurements under the conditions of centrifugal force encountered in the flight of a projectile.

It is an object of the invention to provide unique and novel means for supporting and permitting rotation of an object.

A further object of the invention is to provide means for rotating an object at higher angular velocities than can be attained with conventional bearing supports.

Another object of the invention is to provide a device for spin-testing objects comparable to artillery projectiles in size and mass in the laboratory under conditions of centrifugal force equivalent to those encountered when a projectile is fired from a gun.

Still another object of the invention is to provide such a device in which the object being rotated seeks its own axis of rotation, thus permitting the spinning at high rotational velocities of unbalanced loads and objects of large mass having nonsymmetrically positioned components.

It is also an object of the invention to provide such means for supporting and rotating a generally cylindrical object which permit access to both ends of the object for electrical take-off testing means.

An object of the invention is to provide unique and novel tensioned endless belt means for supporting and for permitting rotation of an object. It is a further object of the invention to provide such endless belt means for supporting the object from a plurality of directions so that the resultant of the horizontal and vertical components of the forces exerted on said object along said directions is zero. Another object is to provide pulley and endless belt means for supporting and for permitting rotation of a cylindrical object so arranged in space about said object that the forces exerted on said object by said belts, or the equal and opposite forces transmitted and exerted on said belts by said object, are in equilibrium.

Another object of the invention is to provide novel floating electrical take-off means for maintaining electrical connections to electrical components and switches within an object being rotated. A still further object of the invention is to provide novel means for electrically connecting the floating take-off means to electrical components within the object being spin-tested.

Although intended primarily to support and permit rotation about its axis of a cylindrical object, any object can be rotated, or spin-tested, in the apparatus of the invention. If the object has circular portions concentric with its axis which can be engaged by endless belts, the object can be driven directly. Objects of other configurations can be inserted within a hollowed rotor supported by endless belts in order to spin-test the object. Hereinafter in the specification and in the appended claims these alternative methods of supporting the object to be rotated will be considered equivalent.

According to the invention tensioned endless belts support an object to be rotated as a common pulley from a number of directions so that the pulls exerted on said object by said belts are in equilibrium. A plurality of rotatably mounted pulleys support and permit rotation of an object through at least three endless belts each operatively engaging the periphery of said object and at least one of said pulleys, and the pulleys are so arranged in space about the periphery of the object that the forces exerted on the object are opposed and balanced. If less than five endless belts, or less than five pulleys, are utilized, the directions of support are directly opposed, i. e., separated by 180°, and the pulleys and belts are disposed above and below the object. For example, if only two wheels are utilized with three endless belts to support and permit rotation of a cylindrical object, two belts operatively engaging the periphery of the object near opposite ends thereof may both engage a single wheel disposed above and coaxial to the object, and a third belt positioned between the two upper belts may engage a single pulley disposed below and coaxial to the object. If three endless belts and three pulleys are utilized, two pulleys may be coaxially disposed above the object and the third pulley positioned below the object and between the two upper belts.

For any number of pulleys less than five, or any number of endless belts less than five, the object to be rotated is not ideally supported against lateral motion perpendicular to its axis and to a plane common to the 180° opposed directions of support. In the preferred embodiment of the invention the object to be rotated is supported from three directions with an angular separation of less than 180° between directions in order to insure against the possibility of lateral movement of the object. Two pairs of pulleys rotatably mounted above and laterally displaced on opposite sides of the axis of a cylindrical object are connected thereto by endless belts. A pulley mounted on the shaft of a motor disposed below the axis of rotation of said object is also connected to said object by an endless belt. The axes of all of the pulleys and the shaft of said motor are substantially parallel to the axis of rotation of said object, and the two sets of pulleys and the pulley on the shaft of the motor are disposed in space about the axis of said object with approximately equiangular separation therebetween. All of said pulleys are of larger diameter than said object and consequently turn at lower rotational velocities. Due to the equiangular separation of the pulleys, the endless belts are so tensioned in opposition that the forces exerted on the object by said belts are in equilibrium. The object is thus supported only through the endless belts and turns about its axis without the aid of bearings. To maintain external electrical connections to electrical components within the object being spin-tested, in the preferred embodiment of the invention a steel shaft covered with an insulating sleeve is coupled to the end of said object and supported coaxially with said object from at least three directions with an angular separation of less than 180° between directions by a similar arrangement of rotatably mounted pulleys and endless belts. Connector rings mounted on the shaft concentric to the axis thereof are electrically connected by wires running through an axial compartment in said shaft to electrical components within the object being spin-tested. Brushes resiliently urged against the collector rings allow external electrical connections to electrical components within said object.

For a better understanding of the present invention, together with other and further objects thereof, reference is made to the following specification and claims and to the accompanying drawings in which:

Fig. 1 is a plan view of the preferred embodiment of the invention;

Fig. 2 is a front view of the apparatus disclosed in Fig. 1;

Fig. 3 is a rear view of the apparatus disclosed in Fig. 1;

Fig. 4 is a view in perspective of the electrical take-off means of the apparatus disclosed in Fig. 1;

Fig. 5 illustrates the means utilized in the apparatus of Fig. 1 for electrically connecting the electrical take-off means to electrical components and switches within the object being rotated;

Fig. 6 is a front view of an alternative embodiment of the invention with the front plate removed;

Fig. 7 is a sectional view through the apparatus of Fig. 6;

Fig. 8 is a diagrammatic front view of another embodiment of the invention; and

Fig. 9 is a diagrammatic front view of still another embodiment of the invention.

The preferred embodiment of the invention illustrated in Figs. 1 to 5 is particularly adapted to rotate, or spin-test, the components of radio proximity fuzes for artillery projectiles under the conditions of centrifugal force encountered during the flight of a projectile. A radio proximity fuze is normally inserted at the nose end of a projectile to complete the ogive thereof. In order to simulate centrifugal conditions encountered in flight, the nose portion of a radio proximity fuze 10 is threaded to one end of a hollowed metallic rotor 11 having the same external dimensions as a projectile. Contained within the nose portion of the radio proximity fuze 10 are the conventional oscillator, amplifier, and antenna. Within the hollowed rotor 11 may be inserted a deferred action type battery, a rear fitting, a centrifugal shorting device of the type shown in U. S. Patent 2,458,470 to Hafstad et al., or any other device it is desired to test under conditions of centrifugal force. Two pulleys 14 of larger diameter than the rotor 11 are rotatably mounted on conventional bearings above and laterally displaced to the right of the rotor 11. Two pulleys 15, similar to the pulleys 14, are rotatably mounted on conventional bearings above and displaced laterally to the left of the axis of the rotor 11. A single pulley 14 and a single pulley 15 are disposed adjacent the nose end of the rotor 11 with the axes thereof parallel to the axis of the rotor; a single pulley 14 and a single pulley 15 are similarly disposed adjacent the rear end of the rotor 11 with axes parallel to the axis of the rotor. Endless nylon belts 17 approximately ⅛ of an inch in diameter connecting the pulleys 14 and 15 to the rotor 11 ride in circumferential grooves 18 in the external periphery adjacent the nose and rear ends of the rotor 11.

Two parallel channels 19 spaced from each other are supported in the same horizontal plane by vertical uprights 20. Metallic studs 22 extending vertically upward from the channels 19 supports a single, long, horizontal metallic rod 23, above each channel 19 parallel to the axis of the rotor 11. A pair of davits 25 bifurcated at one end are attached to each of the rods 23 and extend upwardly at an angle to the horizontal. The rods 23 pass through apertures in the bifurcated end of the davits 25, and set screws 27 engaging the bifurcated portions of the davits 25 permit clamping the davits 25 on the rods 23. A bearing housing sleeve 29 having its axis parallel to the axis of the rotor 11 is secured to each of the davits 25 near the upper end thereof. Shafts 31 attached to each of the pulleys 14 and 15 are supported upon and rotate within conventional bearings 32 housed within the bearing housing sleeves 29.

Flexible connectors 33 secured to the ends of a horizontal metallic cross bar 34 are bolted to the channels 19. The casing of an electric motor 35 is rigidly clamped between a pair of channels 37 having the open ends thereof facing each other by turnbuckles 38 which fit over headed horizontal studs 39 secured to the upright portions of the channels 37. A bolt 41 secured to the upper of the channels 37 is locked to the cross bar 34 by a pair of nuts 42 to position the motor 35 below the axis of rotation of the rotor 11. A pulley 43 having a pair of grooves 44 in the outer circumference thereof is secured to the shaft of the motor 35. Endless nylon belts 46 approximately ⅛ of an inch in diameter riding in the grooves 44 in the pulley 43 and in circumferential grooves 45 formed near the center of the rotor 11 connect the pulley 43 and the rotor 11. The rotor 11 is thus engaged by, and acts as a common pulley for, all of the belts 17 and 46.

At the exceptionally high angular velocities encountered in spinning the rotor 11, some stretching of the belts 17 and 46 occurs and the rotor 11 seeks its own axis of rotation. Each belt 46 is crossed, thus causing it to engage a maximum of the outer periphery of the rotor 11 and to increase the frictional pull on the rotor. In addition, this crossing prevents excessive stretching due to centrifugal force acting on the belts 46. In the preferred embodiment of the invention, the shaft of the motor 35 is positioned horizontally and at an angle of approximately three degrees with the axis of the rotor 11 in order to allow the adjacent portions of the crossed belts 46 to pass freely.

The pulleys 14, 15, and 43 are positioned in space about the axis of the rotor 11 with approximately equiangular separation between the planes defined by the axis of the rotor 11 and the axes of the pulleys 14, 15, and 43 (assuming the shaft of the motor 35 is parallel to the axis of the rotor 11). The angle of separation between each of such planes in the preferred embodiment of the invention is thus approximately 120°, and the belts 17 and 46 are tensioned in opposition so that the pulls exerted on the rotor 11 by the tensioned belts 17 and 46 are balanced by equal and opposite forces, and the resultant of the horizontal and vertical components of the forces exerted on the rotor 11 is zero. The endless belts 17 and the pulleys 14 and 15 suspend and permit rotation of the rotor 11. The endless belts 46 and the pulley 43 support the rotor 11 against upward motion due to the pulls exerted by the belts 17, and in addition rotate the rotor 11. If the rotor 11 is supported from at least three directions, the endless belts 17 and 46 engage the entire periphery of the rotor 11 as in a bearing, but, unlike a bearing, the means for rotating the rotor 11 is operatively connected to the means for supporting the rotor.

A force F, which is the resultant of the total tension in the loose side and the total tension in the tight side of each belt, is exerted along each direction of support in the form of a pull by the belt on the rotor 11. Due to the equiangular separation between the pulleys 14, 15, and 43 in the preferred embodiment of the invention, the rotor is supported from three directions with equiangular separation therebetween. The resultant force, or pull, F exerted on the rotor 11 in any of the three directions of support is balanced by components of the pulls F exerted in the other two directions from which the belt is supported. This arrangement may also be considered in the sense that the rigid rotor 11 transmits and exerts a pull on each belt which is equal and opposite to the force F, but the balancing of forces is the same regardless of the direction in which it is considered that these forces act.

Although equiangular separation is provided between the three directions from which the belt is supported in the preferred embodiment of the invention, the invention is not limited to three directions of supports or to equiangular separation between directions. The object to be rotated may be supported from any number of directions, and as discussed hereinbefore, in one operative model the rotor 11 is supported from only two directions directly opposed to each other. The invention embraces any such spin-testing apparatus in which the resultant of the vertical and horizontal components of the pulls F acting in the directions of support is zero. To provide ideal support against lateral movement, the object to be rotated should be supported from at least three directions. A zero resultant of the vertical and horizontal components of the forces F exerted on the object along the directions of support is theoretically obtained if each plane common to the axis of rotation of the object and the axis of one of the pulleys makes an angle of less than 180° with the next resultant such plane. If two pulleys, or sets of coaxial pulleys, are separated so that such planes make an angle of only slightly less than 180°, e. g., 175°, the force component exerted perpendicular to a plane through the axes of the pulleys is very small, and only a slight support is provided for the rotor in this direction. The practicable limiting separation between such planes is approximately 160° to provide adequate support along this direction.

The pulleys 14, 15, and 43 are larger in diameter than the rotor 11 and thus turn at lower rotational velocities. In the preferred embodiment of the invention, the pulleys 14 and 15 have a diameter at the grooved portions thereof approximately 2½ times the diameter of the rotor 11 at the grooves 18, while the diameter of the pulley 43 at the grooves 44 is approximately three times the diameter of the rotor 11 at the grooves 45. It will thus be seen that when the pulleys 14 and 15 and the wheel 43 are rotating at angular velocities near the limit which it is possible to attain with bearings, the rotor 11 will turn at considerably higher velocities. A rheostat (not shown) in the electrical circuit of the motor 35 permits adjustment of the speed of the motor 35, and thus of the rotor 11, over a wide range. The tensioned endless belts 17 and 46 riding in the circumferential grooves 18 and 45 respectively in the rotor 11 tend to prevent axial movement of the rotor 11. Any axial thrust on the rotor 11 causes the vertical sides of the grooves to exert forces against the belts in such a direction as to increase the tensile stresses in the belts.

In the preferred embodiment of the invention the rotor 11 is approximately 2½ inches in diameter and 10 inches long with a weight of approximately nine pounds, and yet it is possible to attain rotational velocities of the rotor 11 in excess of 50,000 revolutions per minute. Angular velocities as high as 130,000 revolutions per minute have been attained with smaller rotors. The maximum speed attainable with the apparatus of the preferred embodiment of the invention is limited only by the speed of the motor 35 and the ratio between the diameters of the pulley 43 and the rotor, and there is every indication that considerably higher angular rotational velocities are possible. Heretofore, I have found it impossible to spin objects of comparable weight at angular velocities exceeding 11,000 revolutions per minute when conventional bearings were used to support the object. Artillery projectiles for guns currently in use never exceed an angular velocity of 540 revolutions per second in flight, and it is thus seen that the apparatus of the preferred embodiment of the invention permits spin-testing in the laboratory under centrifugal forces equal to or greater than those encountered in the flight of a projectile. Even if the components being tested within the rotor 11 are non-symmetrically arranged with reference to the geometric axis in such a manner as to create an unbalanced condition, the rotor 11 in spinning seeks its own axis of rotation and floats about this axis. The advantage of the disclosed device over spin-testers utilizing conventional bearing supports which rapidly overheat if an unbalanced load localizes the frictional heating is readily apparent.

In the preferred embodiment of the invention the object to be rotated is driven from an electric motor through endless belts. However, the invention is not so limited and includes any known means for driving the object, for example, a rotating electrical field, a frictional drive, or an air stream directed tangentially of the object in a manner analagous to a turbine wheel.

A floating electrical take-off means operatively engaging the object to be rotated is provided to maintain external electrical connections to electrical components within the object. In the preferred embodiment of the invention, "floating" connector-ring means contact brushes resiliently mounted on the stationary frame formed by the channels 19. A steel shaft 52 having its outer periphery covered with an insulating sleeve, preferably of formica (phenol formaldehyde resin), is positioned coaxially of the rotor 11 and secured to the rear end thereof by a universal coupling as hereinafter explained. Two sheaves 55, each having three adjacent circumferential grooves 56 in the exterior periphery thereof, are mounted on opposite ends of the shaft 52. Three coaxial pairs of rotatably mounted pulleys 57, 58, and 59 are disposed in space about the axis of the shaft 52 with equiangular separation therebetween and with axes parallel to the axis of the shaft 52. One pulley 57, 58, and 59, of each pair is positioned adjacent the front end, and the second adjacent the rear end, of the shaft 52. The pair of pulleys 57 is disposed above and laterally displaced to the right of the shaft 52; the second pair of pulleys 58 is disposed above and laterally displaced to the left of the axis of the shaft 52; a third set of pulleys 59 is disposed below the axis of rotation of the shaft 52. Each plane common to the axis of the shaft 52 and the axis of one of the pairs of coaxial pulleys 57, 58, or 59 makes an angle of approximately 120° with the next adjacent such plane. Endless nylon belts 60 riding in the grooves 56 connect the pulleys 57, 58, and 59 to the sheaves 55. The forces exerted on the shaft 52 due to the tensile stresses in the belts 60 (or the pulls exerted on the belts 60 by the shaft 52) are in equilibrium due to the equiangular separation between the directions from which the shaft 52 is supported. The pulleys 57, 58, and 59 are larger in diameter than the shaft 52 and thus turn at lower rotational velocities.

The horizontal rod 23 disposed to the left of the rotor 11 extends through an aperture provided in each of a pair of approximately horizontal rectangular support arms 61 which are bifurcated at one end, and set screws 62 which engage both bifurcations clamp the support arms 61 to the rod 23. Two other approximately horizontal support arms 63 are secured in a similar manner to the horizontal rod 23 which is disposed to the right of the rotor 11. Upwardly extending braces 66 and 67 are attached to the support arms 61 and 63 respectively and a pulley shaft 64 is secured to each brace 66 and 67 near the upper end thereof. The support arms 61 and 63 extend into the region between the rods 23 with a single support arm 61 and a single support arm 63 disposed adjacent the rear end of the shaft 52 and a single support arm 61 and a single support arm 63 disposed adjacent the front end of the shaft 52. Hubs 68 on each of the pulleys 57 and 58 contain conventional bearing 69 which are rotatably supported on the pulley shafts 64. The pulleys 58 are thus rotatably mounted on the braces 66, while the pulleys 57 are rotatably mounted upon the braces 67. Many of the parts have been omitted from Fig. 1 in order to clarify the drawing. Only a single support arm, a single brace 66, a single brace 67, and two of the shafts 64 are shown.

Depending cross arms 69 and 70 (see Fig. 3) pivoted at the inner and adjacent ends of the cross arms 63 and 61 respectively are crossed in an X and joined at their lower ends by turnbuckles 72. Loops at the ends of the turnbuckles 72 hook on horizontal studs 73 mounted at the lower ends of the cross arms 69 and 70. A horizontal axle 74 fitting within registering longitudinal slots 75 and 76 located centrally in the cross arms 69 and 70 respectively is threaded at its ends and secured to the cross arms 69 and 70 by nuts. The cross arms 69 and 70 thus form a toggle linkage which supports the axle 74 below and parallel to the axis of the shaft 52 and permits adjustment of the distance therebetween. Tubular hubs 77 on the pulleys 59 house conventional bearings which are supported on and turn about the axle 74. Adjustment of the turnbuckles 72 raises or lowers the axle 74 toward the shaft 52 and permits variation of the tension in the belts 60 which connect the shaft 52 and the pulley wheels 59.

A horizontal bar 78 (see Fig. 4) secured to the inner ends of the support arms 61 carries a plurality of upwardly extending metallic posts 81; similarly, a horizontal bar 79 (see Fig. 1) secured to the inner ends of the support arms 63 carries a plurality of upwardly extending metallic posts 82. Resilient beryllium copper springs 83 are attached in approximately horizontal position to the posts 81 and 82 by rivets 84. Nonconducting bushings 85 insulate the springs 83 from the metallic posts 81 and 82.

A plurality of outwardly extending circumferential flanges 86 of insulating material, preferably formica (phenol formaldeyhye resin), are provided on the formica sleeve which covers the shaft 52. Annular metallic connector rings 87 are mounted on opposite sides of each flange 86 concentric with the shaft 52. In a manner hereinafter explained, the connector rings 87 are electrically connected to electrical components and centrifugal switches contained within the fuze 10 and rotor 11 by wires 89 (see Figs. 1 and 5) which are disposed in an axial compartment (not shown) in the shaft 52. Carbon brushes 92 are urged against each of the connector rings 87 by the resilient electrical take-off springs 83. Each brush 92 is secured to a segmenal metallic member 93 having a pair of horizontal studs 94 mounted thereon. The beryllium copper springs are bifurcated, and a notch 95 is formed in the outer edge of each bifurcation to receive a horizontal stud 94. In assembly the bifurcations are manually pressed together while the spring 83 is inserted between the studs 94. When released, each bifurcation resiliently urges the notch 95 against the stud 94 to maintain electrical connection between the springs 83 and the carbon brush 92. Equal numbers of springs 83 and brushes 92 are disposed to the left, and to the right, of the shaft 52. All of the brushes 92 to the right of the shaft 52 are urged in the same axial direction against the connector rings 87; while all of the brushes 92 to the left of the shaft 52 are urged against connector rings 87 from the opposite axial direction. Thus the sum of the axial forces exerted on the shaft 52 by the resiliently urged brushes 92 is zero.

Fig. 5 illustrates means for electrically connecting the connector rings 87 on the shaft 52 to electrical components and switches contained within the radio proximity fuze 10 and within the rotor 11. A deferred action type battery (not shown) for a radio proximity fuze conventionally has a plurality of jacks mounted on the nose end thereof for connection to the oscillator and amplifier (nose) portion of the fuze as well as a plurality of pins mounted at the rear end thereof for electrical connection to the rear fitting. A nylon sleeve 96 is provided to snugly receive a deferred action type battery. A partition 97 near the rear end of the sleeve 96 transverse of its axis has a plurality of pins 98 mounted thereon for making electrical connections to the jacks provided on the front end of the deferred action type battery. Housed within the sleeve 96 behind the partition 97 is a network of electrical filters (not shown) which form a choke section to isolate the battery from measuring and indicating instruments externally connected thereto through the connector rings 87 and the brushes 92. A plurality of grooves 101 are provided in the exterior periphery of the sleeve 96 parallel to the axis thereof. Long metallic fingers 102, each electrically connected to one of the pins 98, emerge from the sleeve 96 and lie in the grooves 101.

A cylindrical nylon adapter block 104 is provided with a plurality of electrical jacks 105 to receive the electrical plugs at the rear end of the amplifier can 107 of the radio proximity fuze 10. Each jack 105 is electrically connected to a metallic contact 108 extending rearwardly from the adapter block 104 parallel to the axis thereof and adapted to fit within a groove 101 in the external periphery of the sleeve 96. A plurality of nibs extend rearwardly from the sleeve 96 parallel to the axis thereof and are adapted to fit between, and abut against, radially outward extending projections 110 formed on the outer periphery of a cylindrical connector block 112 near the front end thereof. A nylon coupling rod 114 is connected at its front end by a ball and socket joint to the connector block 112 and at its rear end by a similar ball and socket joint to the shaft 52. Pins 115, extending radially through balls 116 formed at the opposite ends of the coupling rod 114, fit within radially extending slots 118 in the nose end of the shaft 52 and the rear end of the connector block 112 to provide a drive between the shaft 52 and the rotor 11.

A tapered nylon tube 120 is secured to and concentric with a metallic breech fitting 121 adapted to be threaded to the rear end of the metallic rotor 11. An axial compartment 123 is provided in the tube 120 and the breech fitting 121 for the coupling rod 114 which joins the shaft 52 and the connector block 112. A plurality of slender metallic prongs 125 on the forward end near the outer periphery of the nylon tube 120 extend forward parallel to the axis thereof and are adapted to fit between radially outward extending protuberances 127 on the outer periphery near the rear end of the nylon connector block 112. The wires 89 connected to the connector rings 87 extend through an axial compartment (not shown) in the shaft 52 and through the axial compartment 123 in the plug 120 and are individually wired to the prongs 125.

After assembly, the tube 120, the connector block 112, the sleeve 96, and the adapter block 104 respectively abut against each other, and the latter three are assembled within a tubular nylon member 129 adapted to fit snugly within the rotor 11. A plurality of grooves 132 are provided in the inner periphery parallel to the axis of the tubular member 129. Long slender metallic strips 133 located within the grooves 132 extend the length of the tubular member 129. When the connector block 112, the sleeve 96, and the adapter block 104 are inserted into tubular member 129, each metallic strip 133 electrically commons a prong 125 attached to the tube 120, a finger 102 secured to the sleeve 96, and a contact 108 extending rearwardly from the adapter block 104. In the preferred embodiment of the invention, it is possible to maintain eight individual electrical circuits from within the radio proximity fuze 10 and the rotor 11 through the connector rings 87 and springs 83 to external instruments or electrical sources. Through the use of oscilloscopes or recording instruments it is thus possible to observe and record the activation time of the deferred action type battery, the life of the battery, the angular velocity and interval in flight at which the fuze arms, the interval after arming that the fuze becomes activated and numberless other phenomena in the laboratory under the conditions of centrifugal force encountered during the flight of a projectile.

In the preferred embodiment of the invention, the electrical take-off means is operatively connected to the object being spin-tested in that it is driven through the coupling rod 114, but the take-off means is "floating" in the sense that it seeks its own center of rotation and is free to move axially of the rotor 11. It will be understood that such a floating electrical take-off means is not necessary to the invention, and alternative embodiments have connector rings and other electrical take-off means mounted directly on the object being spin-tested, or on a rotor hollowed to receive the object. However, the electrical noise encountered in such embodiments is higher than in the preferred embodiment wherein a separate "floating" electrical take-off means is utilized.

In an alternative embodiment of the invention illustrated in Figs. 6 and 7, the driving means is not coupled directly to the object through an endless belt as in the apparatus illustrated in Figs. 1-4, but is driven indirectly through idler pulleys which in turn are connected to the driving source. A cylindrical metallic rotor 136 hollowed to receive an object to be spin-tested is provided with a plurality of circumferential grooves 137 in the outer periphery thereof. Three sets of four rotatably mounted pulleys, 139, 140, 141, of larger diameter than the rotor 136 and having axes parallel to the axis thereof, are disposed in space about the periphery of the rotor 136 with equiannular separation between sets. Two pulleys 139, 140, and 141 of each set disposed near the front end of the rotor 136 are joined by a common hub; similarly two pulleys 139, 140, and 141 of each set disposed near the rear end of the rotor 136 are joined by a common hub. Endless nylon belts 143 approximately ⅛ inch in diameter ride in the grooves 137 and connect the pulleys 139, 140, and 141 to the rotor 136. The pulleys are disposed about the axis of rotation of the rotor 136 so that the endless belts 143 are tensioned in opposition and the rotor is supported from three directions with approximately 120° separation between directions. The resultant of the horizontal and vertical components of the forces exerted on the rotor 136 by the pulls of the belts 143 along the directions of support is zero in exactly the same manner as explained for the preferred embodiment of the invention. Two metallic end plates 145 positioned beyond the ends of the rotor 136 are joined by frame support bars 146 parallel to the axis of the rotor 136. Three parallel davits 147 pivoted about a frame support bar 146 positioned to the right of the rotor 136 rotatably support at their upper ends an idler shaft 149. Two pairs of pulleys 139 disposed above and displaced laterally to the right of the rotor 136 are rotatably mounted on the idler shaft 149 through conventional bearings. In a similar manner three parallel davits 150 pivoted on a frame support bar 146 support at their upper end an idler shaft 151 on which four pulleys 140 disposed above and displaced laterally to the left of the rotor 136 are rotatably mounted through conventional bearings. Apertures are provided in the davits 147 to receive a davit support bar 165 parallel to the axis of the rotor 136; a davit support bar 166 similarly joins the three davits 150. Eyebolts 152 attached to the davit support bars 165 and 166 pass through clearance holes provided in belt take-up members 153 secured to the end plates 145, and knurled nuts 154 threaded on the eyebolts 152 allow adjustment of the distance between axes of the rotor 136 and the pulleys 139 and 140 by pivoting the davits 147 and 150 respectively about the frame support bars 146. By threading the knurled nuts 154 further onto the eyebolts 152, the davits 147 and 150 are pivoted so as to make a smaller angle with the vertical and thus increase the tension in the endless belts 143 which connect the rotor 136 to the pulley wheels 139 and 140.

Drive shaft supports 155 adjacent and parallel to the end plates 145 are secured to frame support bars 146 and support a drive shaft 156 below and parallel to the axis of rotation of the rotor 136. Two pairs of pulleys 141 are rotatably mounted on the shaft 156 by conventional bearings. The pulleys 141 are connected to the rotor 136 by endless nylon belts 143 which ride in the circumferential grooves 137 in the rotor 136. Two electric motors 158 disposed below the shaft 156 are belted to rotate the drive pulleys 141. Endless nylon belts 159 ride in circumferential grooves 160 provided in a sheave wheel 162 mounted on the shaft of each motor 158 and in grooves 164 in the hubs common to the pairs of pulleys 141.

The metallic rotor 136 is approximately three inches in internal diameter and 14 inches long and is open at both ends to allow easy access for electrical take-off means. Rheostats (not shown) provided in the electrical circuits of the motors 158 provide adjustment of the rotational velocity of the rotor 136 over a wide range. The pulleys 139, 140, and 141 provide a three-directional supporting means for the rotor which turns on its own axis when the motors 158 are electrically energized.

It will be readily understood that the invention is not limited to three sets of belts and pulleys with equiangular separation therebetween, and any desired number of sets of pulleys and belts may be utilized as long as the pulls exerted by the belts on the rotor are balanced. Nor is the invention limited to apparatus in which each endless belt engages only one pulley and the object to be rotated. Fig. 8 illustrates an alternative embodiment of the invention in which each endless belt 167 engages two of the pulley wheels 168 and rotor 169, pulley wheels 168 being disposed about the rotor 169 with equiangular separation therebetween.

In still another embodiment of the invention illustrated in Fig. 9, three sets of pulleys with only two sets of endless belts are utilized. Two sets of rotatably mounted pulleys 171 displaced below and on oposite sides of the rotor 172 are connected to the rotor by endless belts 173 each of which operatively engages the periphery of the rotor 172 and two of the pulleys 171.

While several embodiments of the invention have been shown and described in detail, it will be understood that these are illustrative only and are not be be taken as a definition of the scope of the invention, reference being had for this purpose to the appended claims.

I claim:

1. A device for supporting a cylindrical object to be rotated about its axis comprising a plurality of rotatably mounted pulleys, at least three endless belts each operatively engaging the periphery of at least one of said pulleys and the periphery of said object to make said object a common pulley for said belts, said pulleys being rotatably mounted beyond the circumference of said object and arranged along equiangular radii of said object whereby the pulls transmitted and exerted by said object on said belts are in equilibrium, and means for rotating said object.

2. A device for supporting and for permitting rotation of a cylindrical object about its axis, comprising a plurality of rotatably mounted pulleys, at least three tensioned endless belts each operatively engaging the periphery of at least one of said pulleys and the periphery of said object whereby said object acts as a common pulley for said belts, the resultant of the total tension in the tight side and of the total tension in the loose side of each belt exerting a pull on said object which acts through the axis thereof, said pulleys being rotatably mounted beyond the circumference of said object and arranged along equiangular radii of said object whereby the resultant of the vertical and horizontal components of said pulls is zero, and means for rotating said object.

3. A device for supporting and for permitting rotation of an object about its axis comprising at least five rotatably mounted pulleys arranged in spaced relationship around the periphery of said object, the axes of said pulleys and the axis of said object defining at least three planes each intersecting the axis of said object and making angles of less than 180° with each other, at least three tensioned endless belts each operatively engaging the periphery of said object and at least one of said pulleys, and means for rotating said object.

4. A device in accordance with claim 3 wherein said object contains electrical components and including electrical take-off means operatively connected to said object for maintaining external electrical connections to said components.

5. A device for supporting and for permitting rotation of an object about its axis comprising at least five rotatably mounted pulleys, at least five endless belts each operatively engaging the periphery of said object and at least one of said pulleys, said pulleys being so arranged in space about the periphery of said object that said object is supported from at least three directions and the resultant of the horizontal and vertical components of the forces exerted on said object along said directions by said belts is zero, and means for rotating said object.

6. A device in accordance with claim 5 wherein said object contains electrical components and including electrical take-off means operatively connected to said object for maintaining external electrical connections to said components.

7. A device in accordance with claim 5 wherein said pulleys are of larger diameter than said object.

8. A spin-testing device comprising means for suspending and for permitting rotation of an object to be spin-tested, means including at least one endless belt operatively engaging the periphery of said object for rotating said object, said first named means being arranged above and displaced laterally from the axis of rotation of said object, said second named means being disposed below the axis of rotation of said object.

9. A spin-testing device in accordance with claim 8 wherein said object is rotated at a greater speed than said second named means.

10. A high rotational velocity spin-testing device comprising a cylindrical rotor provided with a plurality of circumferential grooves and hollowed to receive an object to be spin-tested, two pairs of pulleys of larger diameter than said rotor rotatably mounted above and displaced laterally on opposite sides of the axis of said rotor, a drive means having a drive shaft below said rotor, at least one pulley of larger diameter than said rotor on said shaft, and a plurality of endless belts each riding in one of said circumferential grooves and operatively engaging at least one of said pulleys.

11. A device for supporting and for permitting rotation about its axis of an object containing electrical components comprising at least three rotatably mounted pulleys and at least three endless belts each engaging the periphery of said object and at least one of said pulleys with said pulleys so arranged in space around the periphery of said object that the forces exerted on said object by said belts are in equilibrium, means for rotating said object, a shaft coaxial with and coupled to the end of said object, at least three other rotatably mounted pulleys and at least three other endless belts each operatively engaging the periphery of said shaft and at least one of said other pulleys with said other pulleys so arranged in space about the axis of said shaft that the forces exerted on said shaft by said other belts are in equilibrium, and means electrically connected to said components within said object and operatively connected to said shaft for maintaining external electrical connections to said components.

12. A device for supporting and for permitting rotation about its axis of an object containing electrical components comprising at least five rotatably mounted first pulleys, at least five endless first belts each operatively engaging the periphery of said object and at least one of said first pulleys whereby said object is a common pulley for all of said first belts, the axes of said first pulleys and the axis of said object defining at least three planes intersecting the axis of said object and making angles of less than 180° with each other, means for rotating said object, a shaft coaxial with and engaging one end of said object, at least five rotatably mounted second pulleys, at least five endless second belts each operatively engaging the periphery of said shaft and at least one of said second pulleys whereby said shaft is a common pulley for said second belts, the axes of said second pulleys and the axis of said shaft defining at least three planes intersecting the axis of said shaft and making angles of less than 180° with each other, a plurality of connector rings insulated from each other on said shaft, means for electrically connecting said conector rings to electrical components within said object, and brush means resiliently urged against said connector rings for maintaining external electrical connections to said electrical components within said object.

13. A spin-testing device comprising a rotor hollowed to receive an object containing electrical components to be spin-tested, two sets of pulleys of larger diameter than said rotor rotatably mounted above and laterally displaced on opposite sides of the axis of rotation of said rotor, a motor below said rotor, a pulley, also of larger diameter than said rotor, on the shaft of said motor, a plurality of endless belts each operatively engaging the periphery of said rotor and at least one of said pulleys, a shaft coaxial with and engaging one end of said rotor, at least three sets of rotatably mounted second pulleys of larger diameter than said shaft arranged about the axis of rotation of said shaft with approximately equiangular separation between sets, a plurality of second endless belts each operatively engaging the periphery of said shaft and at least one of said second pulleys, a plurality of connector rings insulated from each other on said shaft, means for electrically connecting said rings to said electrical components within said object, and a plurality of brushes resiliently urged against said connector rings.

14. A device for spin-testing an object containing electrical components comprising first endless belt means for permitting rotation of and for supporting said object from at least three directions with an angular separation of less than 180° between directions, a shaft coaxial with and engaging one end of said object, second endless belt means for permitting rotation of and for supporting said shaft from at least three directions with an angular separation of less than 180° between directions, and connector-ring-and-brush means electrically connected to said components and operatively connected to said shaft for maintaining external electrical connections to said components.

ELLIS BURRELL.

References Cited in the file of this patent

UNITED STATES PATENTS

| Number | Name | Date |
|---|---|---|
| 2,353,150 | Dietz | July 11, 1944 |
| 2,478,663 | Masket et al. | Aug. 9, 1949 |
| 2,524,413 | Migula | Oct. 3, 1950 |
| 2,547,940 | Hearn | Apr. 10, 1951 |